H. HILDENBRAND.
CONVEYER TRANSFER.
APPLICATION FILED MAY 5, 1913.
1,090,713.
Patented Mar. 17, 1914.
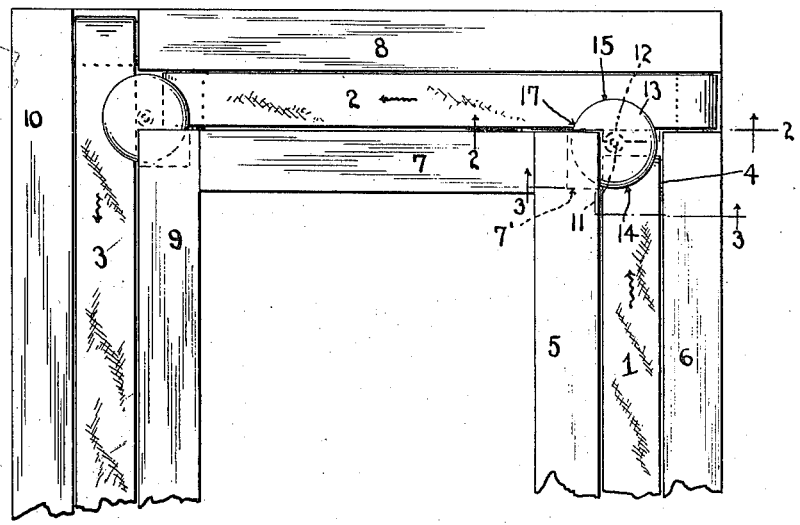
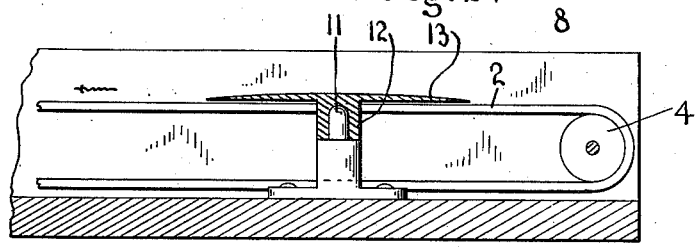
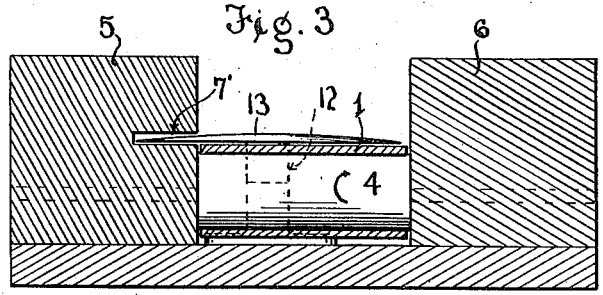
Inventor
Herman Hildenbrand
Witnesses

UNITED STATES PATENT OFFICE.

HERMAN HILDENBRAND, OF CHAPEZE, KENTUCKY.

CONVEYER-TRANSFER.

1,090,713.  Specification of Letters Patent.  Patented Mar. 17, 1914.

Application filed May 5, 1913. Serial No. 765,621.

*To all whom it may concern:*

Be it known that I, HERMAN HILDENBRAND, a citizen of the United States, residing at Chapeze, in the county of Bullitt and State of Kentucky, have invented certain new and useful Improvements in Conveyer-Transfers; and I do declare the following to be a full, clear, and exact description of the invention, such as will enable others skilled in the art to which it appertains to make and use the same.

This invention relates to conveyers, and more especially it is a transfer device for shifting an article being carried by one conveyer such as an endless belt, to another conveyer such as another endless belt moving at right angles thereto.

The invention comprises a disk rotating in a plane just above that of the upper stretches of the belts referred to, and guides associated with said disk to accomplish the object sought.

Details will be found in the following specification and claims, and are shown in the drawings wherein—

Figure 1 is a plan view illustrating three belts whereof the second is at right angles to the first and the third at right angles to the second, and one of my improved transfer devices is located at each junction point. Fig. 2 is a cross section on the line 2—2, and Fig. 3 a cross section on the line 3—3 of Fig. 1.

The conveyers herein shown are of the endless belt type with the upper stretches 1, 2, and 3 of the three belts lying in a single horizontal plane and moving over suitable rollers 4 whose driving mechanism need not be illustrated. The second conveyer passes across the rear end of the first and is slightly spaced therefrom, and in the drawings the third conveyer passes across the delivery end of the second and is also slightly spaced therefrom. The illustration is sufficient to show conditions which sometimes prevail wherein it is desired that articles carried by one belt shall be transferred to another belt moving at right angles across the delivery end thereof, and these articles may be bottles, bricks, cans, or other small units ordinarily carried on the belt at slight distances apart. Such being the case, the belts are disposed between upright strips or beams forming guides numbered 5 and 6, 7 and 8, 9 and 10; and these guides constitute the sides of a channel of which the belts are the bottom. Disposed in the angle between the first channel and the second is an upright pin or bearing 11 whereon is journaled the hub 12 of a disk 13, and this hub may make contact with the edge of the belt 2 so that it rotates in the direction of the arrow. The edge of the disk moves within a notch 7' in the guide 7, which notch covers that edge of the disk which is moving reversely to the direction of the belt 1. The front edge 14 slightly overlies said belt, and the rear edge 15 extends over the belt 2 for about half the width of the latter. Any suitable means may be provided to rotate this disk, although that suggested is doubtless the simplest.

When now an object is placed on the belt 1 and carried thereby in the direction of the arrow, on reaching the edge of the disk 13 which moves very closely across the face of this belt it will slide onto the disk to a slight extent and be carried to the right until it comes into contact with the right hand guide 6; a continuous forward impulse being imparted to it by the movement of the belt 1, and further lateral movement being resisted by the guide 6, the result will be that the object will move farther and farther onto the disk until finally it is carried around by the same in the direction of the arrow and taken wholly off of the belt 1. Reaching the point 17 it comes in contact with the far side of the guide 7, and as the disk continues to rotate the object is pushed off its edge and dropped onto the belt 2. Here it travels along in the direction of the arrow, and if another transfer device be provided where shown this operation will be repeated. I have found this device extremely useful for transferring bottles, but do not wish to be confined to this use of the same; and of course the proportions and materials of parts are not essential to its successful operation.

What is claimed as new is:

1. In a transfer device of the character set forth, the combination with an endless conveyer belt whose upper stretch moves horizontally, and feed mechanism directed laterally toward said belt; of a disk closely overlying the belt and the mechanism and having a hub bearing against the edge of the belt whereby the disk is rotated, and means for holding the disk in operative position, substantially as described.

2. In a transfer device of the character set forth, the combination with two conveyers standing in a horizontal plane, the second moving across the delivery end of the first; of an upright pin fixed between said conveyers, a disk closely overlying said conveyers and having a hub journaled on said pin and bearing against the edge of the second conveyer whereby rotary motion is imparted to the disk, and guides alongside said conveyers.

3. In transfer device of the character set forth, the combination with a pair of parallel spaced guides producing a channel, a second pair of similar guides producing a second channel at an angle to the first, an endless conveyer belt whose upper stretch moves along the second channel, and an endless feed belt whose upper stretch moves along the first channel and whose delivery end is spaced from the side of said second belt; of a disk mounted on an upright axis in the space between the belts with its body closely overlying said belts, and means for rotating said disk in a direction to cause its front edge to move transversely of the feed belt and its rear edge to follow the direction of movement of said second belt, the guide on that side of the disk whose edge is moving reversely to the direction of the feed belt being notched to receive the disk.

In testimony whereof I have hereunto set my hand in presence of two subscribing witnesses.

HERMAN HILDENBRAND.

Witnesses:
W. T. Morrow,
E. Osburn.